Patented Dec. 19, 1933

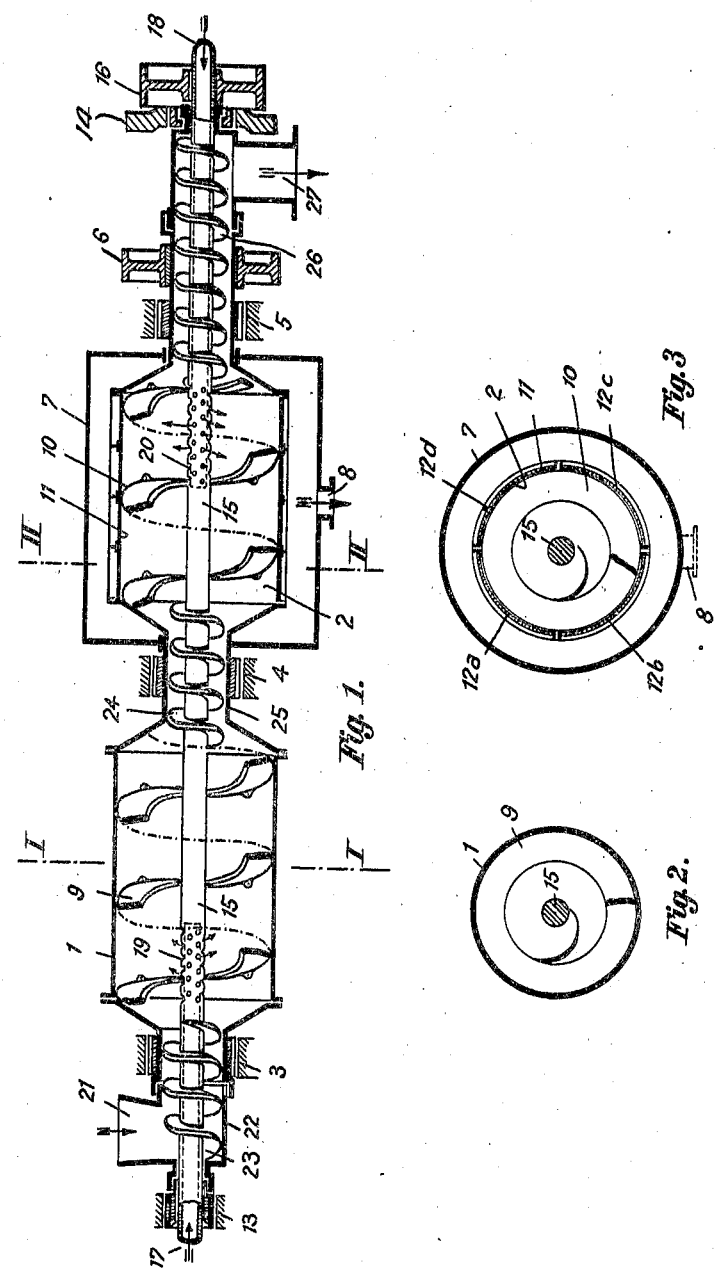

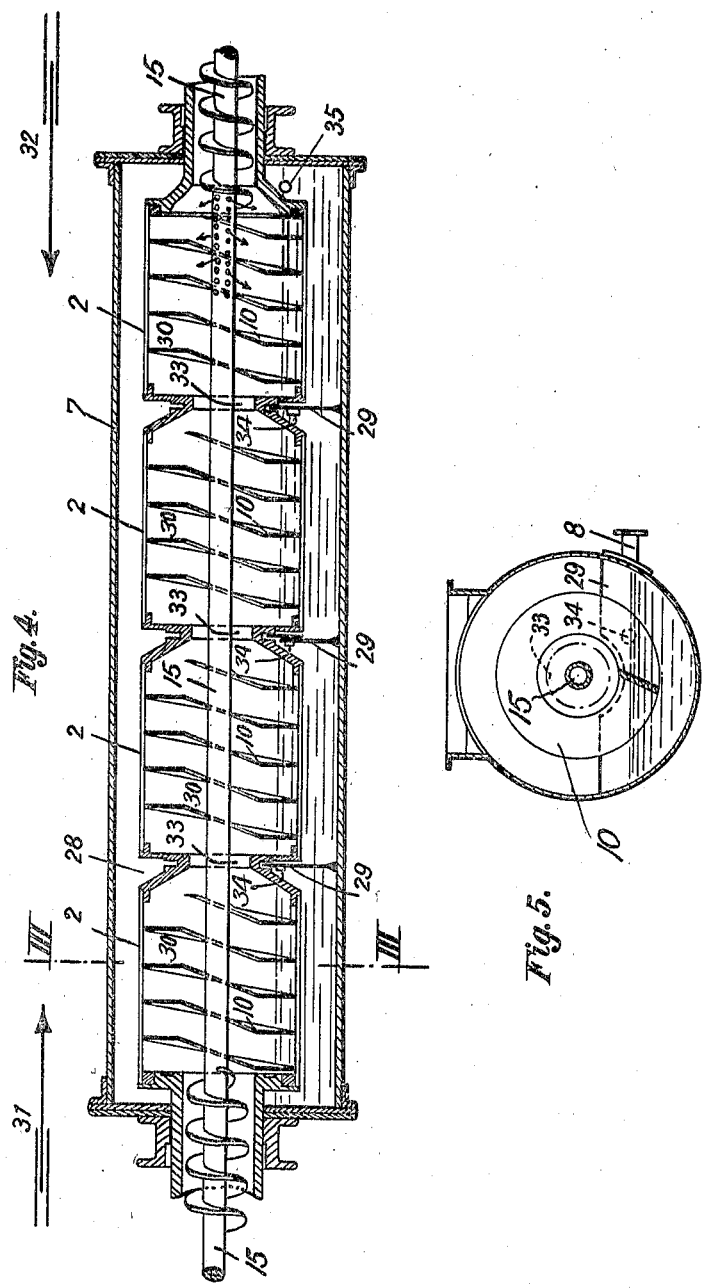

1,940,585

UNITED STATES PATENT OFFICE 1,940,585

CONTINUOUS EXTRACTION AND FILTRATION APPARATUS

Philipp Lorenz Fauth, Wiesbaden, Germany

Application May 29, 1930, Serial No. 457,224, and in Germany June 14, 1929

4 Claims. (Cl. 87—6)

Heretofore valuable extracts of oil-containing material, such as seeds or the like, and miscellaneous filtration has generally been effected in a special apparatus. In prior practice, however, there has been the defect that the extraction has taken place in a continuous manner while it has not been possible to carry out continuous filtration because the filter used always remained entirely operable only for a limited time and it was necessary to renew it from time to time. This, however, considerably lowers the practicability of the process.

Apparatus for this purpose having drum bodies which rotate in a cylinder which is partially filled with solvent have been known. Here, however, there is a washing without a continuous operation because a simultaneous removal of the extracted material does not occur.

It has already been proposed to conduct the extraction material to the solvent by means of screw conveyors. Here it has been shown that the material conveyed in a stationary spiral trough clogs the stationary filter bottom of the trough after a short period of operation.

On the other hand, filter cloths, tin sieves, porous stone, etc., heretofore used cannot be employed for continuous filtration, because, for example, cloths absorb moisture in a short time and become impenetrable, while sieves, although remaining penetrable, cannot give a clear filtrate, and rotating porous stones permit the passage only of liquids, when they are so coarsely porous that a clear filtrate cannot be obtained. If the grains, however, are so fine that a clear filtrate is possible, a rotating stone permits passage of nothing at all.

The new apparatus according to this invention, consists of a rotating drum divided into two subdivisions by means of a restriction. In the first part of the drum the material to be treated is saturated with solvent, while in the second part of the drum it is filtered and washed.

Longitudinally of the drum extends a rotary partially hollow shaft which serves as an inlet for the solvent to the interior of the drum. The shaft supports screw conveyors which move the extraction material from a stationary trough provided with an inlet hopper first to the saturating or enriching drum and then to the filtering and washing drum, from which it reaches the outlet of the apparatus.

On the inner walls of the drum body, according to the invention, spirals are mounted which intimately mix the material and move it through the drums.

The shaft and two part drum body have separate drives, the relative speeds of which can be adjusted as required. In this way regulation of the period of saturation of the extraction material with solvent, as well as of the extraction, is made possible.

Use of a saturating drum, as opposed to known feeding spirals, affords the important advantage that the extraction material comes into intimate contact with the solvent, whereby solution of the oil or fat is favored.

The restriction at the junction of the two drums results in maintaining a certain condition of solvent in the enriching drum such that a continued repeated soaking of the material with solvent occurs. This is not possible with a screw conveyor, because its helical trough must always have its outlet on the bottom.

In addition, according to the invention, the casing of the filter drum is covered with an anti-moisture impregnated silk for filtering. This filter covering absorbs no moisture whatever and therefore need not be changed, whereby an entirely continuous operation is made possible.

The filter drum is surrounded by a stationary casing which catches the filtered miscellaneous matter and conveys it through an outlet to the distilling means.

The modified form of filtering and extracting drum, as shown in Figs. 4 and 5, is subdivided into several compartments by constrictions and the insertion of partitions. The successively articulated drum compartments makes possible repeated washing of the material in the individual compartments and to appreciably raise the efficiency of the filtration. The solvent and extraction material can thus be exposed to each other in a counter current.

In this modification of the drum, the material being treated (seeds or the like) and the solvent remain in intimate contact for a considerable period, which tends to increased economy.

The invention is hereinafter described, by way of example, with reference to the accompanying diagrammatic drawings in which:—

Figure 1 is a longitudinal section illustrating one construction of apparatus according to the invention. Figures 2 and 3 are sections along the lines I—I, and II—II respectively of Figure 1.

Figure 4 is a longitudinal section illustrating a modification, and Figure 5 is a section on the line III—III of Figure 4.

In carrying the invention into effect and with reference to Figures 1 to 3 of the accompanying diagrammatic drawings, the rotating member consisting of the two drums 1 and 2 is mounted in the bearings 3, 4 and 5, and is driven by the driving pulley 6. A stationary casing 7 having a discharge pipe 8 surrounds the drum 2. Helical blades 9 and 10 are fixed to the inner walls of the drums 1 and 2. The circumference of the drum 2 is constructed in the form of a filter 11, which consists of separate frame parts, for example of four parts, 12a to 12d, as shown in section in Figure 3, covered with silk impregnated against moisture.

A partially hollow rotatable shaft 15 is disposed co-axially with the rotating members 1 and 2, and is mounted in the bearings 13 and 14, which shaft 15 is driven by the driving pulley 16. The solvent necessary for the extraction enters the hollow shaft 15 at 17 and 18, from which points it is conveyed through perforations 19 and 20 in the shaft into the interior of the drum in contact with the extraction material.

The extraction material introduced through the inlet funnel, a hopper 21 falls into the trough 22, where it is caught up by the screw conveyor on the shaft 15, and is thereby conveyed into the impregnating drum 1. The material is here continuously impregnated to the point of complete saturation with the solvent entering at 19, in such a way that the rotating drum 1 with its helical blades 9 constantly kneads the material under treatment and conveys the same to the second screw conveyor 24, situated on the shaft 15. This screw conveys the material through the constriction 25 between the drums 1 and 2 to the filtering and washing drum 2. The material is here also again worked up by the helical blades 10, and is subjected to further repeated washing by the solvent issuing from the perforations 20.

The drum wall 2 constructed in the form of a filter 11 allows the solvent saturated with oil and fat (miscella) to flow into the casing 7, from which it passes through the discharge pipe 8 to the distillation apparatus. Owing to the continuous rotation of the drum, the surface of the filter 11 as it comes to the top, is constantly freed afresh from the adhering extraction material, because the latter falls downwards owing to its own weight and the moisture contained therein is not absorbed by the impregnated silk. In this way constant and uniform permeability of the filter and a continuous operation are ensured.

The helical blades 10 pass the filter residue remaining in the drum 2 on to the screw conveyor 26 of the shaft 15, which conveys it to the discharge pipe 27. The residue leaving the apparatus at this point can, if desired, be again introduced into the extraction apparatus or to a further apparatus operating in the same manner in order to obtain as clear a filtrate as possible. Further several drums 2 may be connected one behind the other.

According to the modification illustrated in Figures 4 and 5, the drum 2 is divided into drum cells 30 by constrictions 28, into which the partitions 29 interlock. The material under treatment is introduced in the direction of flow of the arrow 31, whilst the solvent is introduced into the filter drum in the direction of the arrow 32. The apparatus therefore operates on the counter-current principle. The screw conveyor 10 of the individual cells conveys the material, in the manner hereinbefore described, from one cell to another through the constricted openings 33 between the cells. The solvent, which enters through the hollow shaft 15, fills the external drum 7 to a definite height, and flows through the overflows 34 situated in the partition walls 29 from one cell to the other, and finally passes through the discharge pipe 8 attached at 35 to the distillation plant in the form of a highly saturated filtered miscella. By means of this modification the extraction material comes into particularly intimate contact with the solvent and consequently thorough washing is effected.

In a further modification the apparatus may consist only of a filter and washing drum such as the drum 2. In this case, the material must be introduced into the drum in a state of complete saturation with the solvent. The above described filtering and washing drum is then in itself a continuous operating filter.

After the extraction has been completed the discharged material may be subjected in known manner to pressure in order to remove the greater portion of the solvent. The expulsion of the residual solvent is then effected in a continuous process by means of a suitable expelling apparatus which follows immediately on the former. If desired a pressing out process may be inserted between the individual drum systems, so that repeated pressing is effected in known manner in combination with the extraction by means of the above described drum system.

What I claim is:—

1. Apparatus for continuously extracting and filtering material containing a soluble substance by means of a solvent, comprising a rotatable impregnating drum wherein the material to be treated is impregnated with solvent and a rotatable washing and filtering drum rigidly connected in axial alignment with the impregnating drum, separate means for passing the raw material and solvent into said drums, and separate means for removing the resulting filtrate and residue from said drums, said filtering drum having a covering formed of impregnated moisture-proof silk.

2. Apparatus for continuous extraction and filtration of material containing a soluble substance comprising a rotatable drum provided with transverse constrictions forming compartments in series, at least one of said compartments being perforated, an independently rotatable conveyor means within said drum, means for producing a continuous flow of material under treatment through said compartments, means for continuously removing said material from the drum, and means for continuously directing solvent through said material in the opposite direction to its flow.

3. Apparatus for continuously extracting and filtering material containing a soluble substance by means of a solvent, comprising an impregnating drum wherein the material to be treated is impregnated with a solvent and a rotatable washing and filtering drum rigidly connected with the impregnating drum, spiral conveyors fixed to the inner walls of said drums, said filtering drum having a wall pervious to the solvent and extract and a rotatable shaft extending through the drums, conveyor means on said shaft, means to rotate said shaft, separate means to rotate said drums, and means to regulate the speed of rotation of said shaft and drums.

4. An extracting and filtering apparatus comprising a rotatable impregnating drum for impregnating a material with a solvent, a rotatable washing and filtering drum rigidly connected in axial alignment with said impregnating drum, a constriction in said rigid connection, separate means for feeding the raw material and the solvent into said drums, and separate means for withdrawing the resulting filtrate and residue from said drums, said filtering drum having a wall pervious to the solvent and extract.

PHILIPP LORENZ FAUTH.